United States Patent [19]

Peck

[11] Patent Number: 4,559,655

[45] Date of Patent: Dec. 24, 1985

[54] BED HAVING ARTICULATED FRAME

[75] Inventor: William Peck, Oldenburg, Ind.

[73] Assignee: Hill-Rom Company, Inc., Batesville, Ind.

[21] Appl. No.: 407,037

[22] Filed: Aug. 11, 1982

[51] Int. Cl.[4] ........................... A61G 7/06; F16H 1/18

[52] U.S. Cl. ............................................ 5/66; 5/68; 74/424.8 R

[58] Field of Search ........................................ 5/66–69; 248/406, 422; 74/424.8 R

[56] References Cited

U.S. PATENT DOCUMENTS

| | | | |
|---|---|---|---|
| 1,003,865 | 9/1911 | Barnett | 5/68 |
| 3,154,284 | 10/1964 | Martens et al. | 74/424.8 R |
| 3,174,161 | 3/1965 | Black | 5/68 |
| 4,038,709 | 8/1977 | Kerwit | 5/66 |
| 4,250,762 | 2/1981 | Weatherby | 74/424.8 R |

FOREIGN PATENT DOCUMENTS

| | | | |
|---|---|---|---|
| 693397 | 11/1964 | Canada | 5/67 |
| 2525596 | 12/1976 | Fed. Rep. of Germany | 5/67 |

*Primary Examiner*—Kenneth J. Dorner
*Assistant Examiner*—Michael F. Trettel
*Attorney, Agent, or Firm*—Burns, Doane, Swecker & Mathis

[57] ABSTRACT

A hospital bed includes a base and a mattress frame mounted on the base. The frame includes an articulated head section, the inclination of which is controlled by a motor. A screw oriented lengthwise of the bed is connected to the motor for rotation thereby. A nut is mounted on the screw for longitudinal movement therealong. A non-rotatable sleeve is mounted on the nut by bearings which permit rotation of the nut relative to the sleeve about the longitudinal axis. A linkage interconnects the sleeve with the frame head section for changing the inclination of the latter in response to longitudinal movement of the sleeve. An element mounted on the sleeve is movable into operable connection with the nut for preventing rotation of the nut and thereby constraining the nut for longitudinal movement along the screw in accordance with the speed of rotation of the screw. A manually actuable handle is mounted on the head section and is connected to the element for releasing the latter from the nut, allowing the nut to rotate upon the screw and travel longitudinally therealong independently of the speed of rotation of the screw. Thus, the head section of the frame can be lowered at a rapid rate, regardless of the operational speed of the motor.

17 Claims, 7 Drawing Figures

Fig. 5
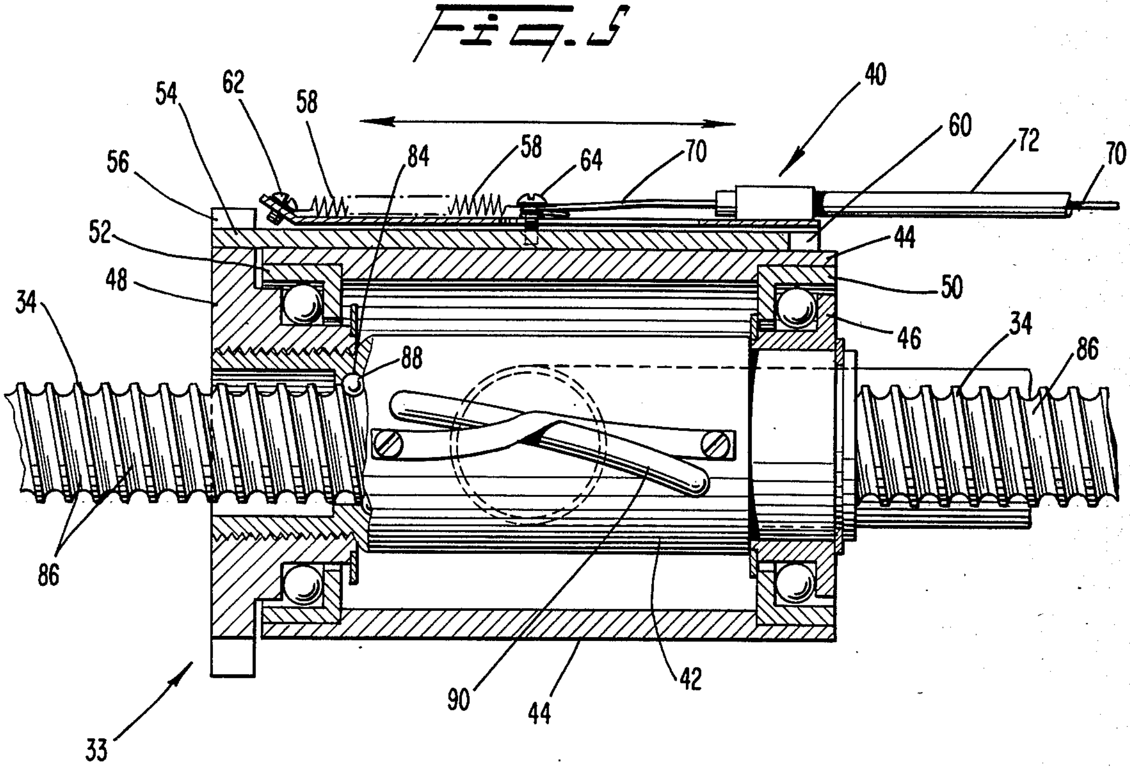
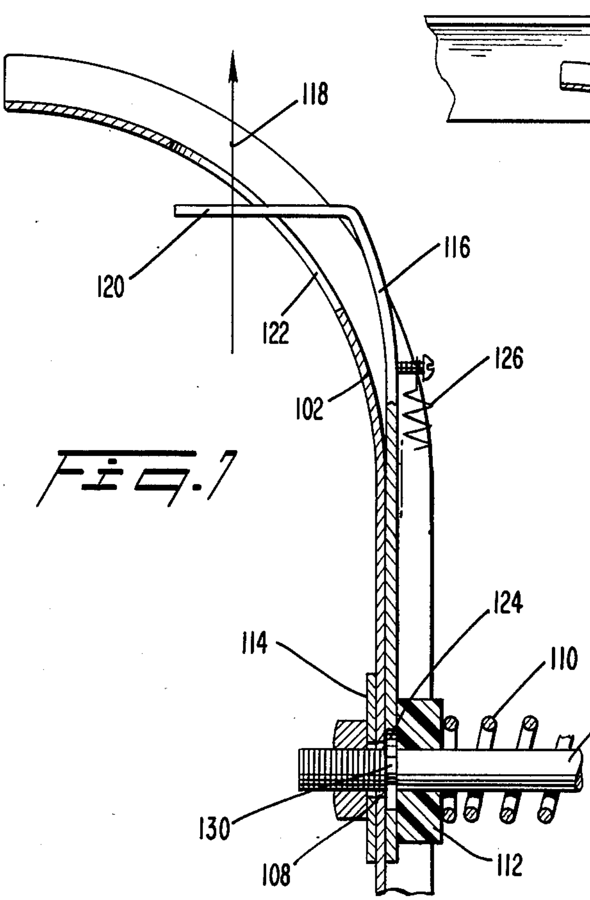
Fig. 7
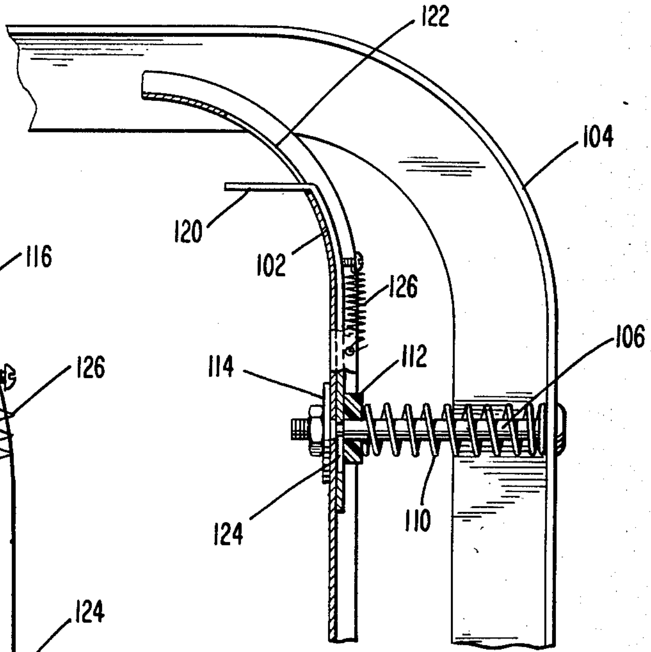
Fig. 6

BED HAVING ARTICULATED FRAME

BACKGROUND AND OBJECTS OF THE INVENTION

The present invention relates to motor-operated hospital beds having an articulated support frame, wherein a head section of the frame can be selectively raised and lowered.

Motorized operated hospital beds are conventional in which the head and leg sections of an articulated frame can be selectively raised and lowered by one or more electric motors. In this fashion, a patient's back and/or legs can be adjusted to a desired inclination. Exemplary of such a hospital bed is the disclosure in U.S. Pat. No. 4,097,940 issued to Tekulve et al on July 4, 1978, the disclosure of which is hereby incorporated by reference as if set forth at length herein.

The actuating mechanism for the head section of the articulated mattress frame may include an electric motor which rotates an elongated threaded shaft. A nut is threadedly mounted for longitudinal movement along the shaft and is fixed against rotation relative thereto. Thus, rotation of the shaft produces longitudinal travel of the nut. A linkage interconnects the nut and the head section of the articulated frame in such a way as to convert longitudinal motion of the nut into rotational movement of the head section, thereby altering the inclination of the latter. The motor can be deactivated at any time to hold the head section in a given position of adjustment.

Typically, relatively high-torque, slow-speed electric motors are employed which impart a slow, gentle motion. However, such slow-speed motors are disadvantageous in the event of an emergency requiring immediate treatment of the patient in a fully reclined, horizontal position, such as in the case of heart stoppage, for example. Any undue delay in positioning the patient in the proper posture for treatment can produce serious consequences.

It is, therefore, an object of the present invention to minimize or obviate problems of the above-discussed sort.

Another object of the invention is to enable the head section of an articulated bed frame to be rapidly lowered to a retracted, horizontal position.

A further object of the invention is to provide for such rapid lowering without eliminating the slow, gentle motion produced during normal raising and lowering of the head section.

An additional object of the invention is to provide a manually actuable over-ride mechanism which permits lowering or raising of the head section of the frame independently of the tilt motor.

A further object is to permit the head section to be raised or lowered independently of the motor in the event of an emergency, electrical failure, or operational malfunctions in the drive train.

SUMMARY OF THE INVENTION

These objects are achieved in accordance with the present invention which involves a bed comprising a base and a body support frame mounted on the base. The frame includes a movable head section for adjusting the inclination of a user's upper torso. A motor is provided and a connection structure operably couples the motor to the head section of the frame for changing the inclination of the head section at a speed governed by the motor. A manually actuable release mechanism uncouples the drive connection between the motor and the head section to enable the latter to be moved downwardly independently of the speed of the motor.

Preferably, the motor rotates a screw-like shaft which extends longitudinally of the bed. A nut is threadedly mounted on the screw. A sleeve is rotatably mounted upon the nut and is connected by a linkage to the head section of the frame. The sleeve is constrained against rotation. A latch is mounted on the sleeve and is movable into engagement with the nut to constrain the nut against rotation, whereby rotation of the screw produces longitudinal movement of the nut at a speed governed by the motor. When the latch is uncoupled from the nut, the nut is free to rotate relative to the screw whereby the traveling unit comprising the nut and sleeve can be moved longitudinally along the screw independently of the speed of rotation of the screw. In this fashion, the head section of the frame can be moved downwardly independently of the motor.

THE DRAWINGS

The objects and advantages of the invention will become apparent from the following detailed description of a preferred embodiment thereof, in connection with the accompanying drawings in which like numerals designate like elements, and in which:

FIG. 5 is a longitudinal sectional view taken through the traveling unit depicted in FIG. 4;

Figure 1:
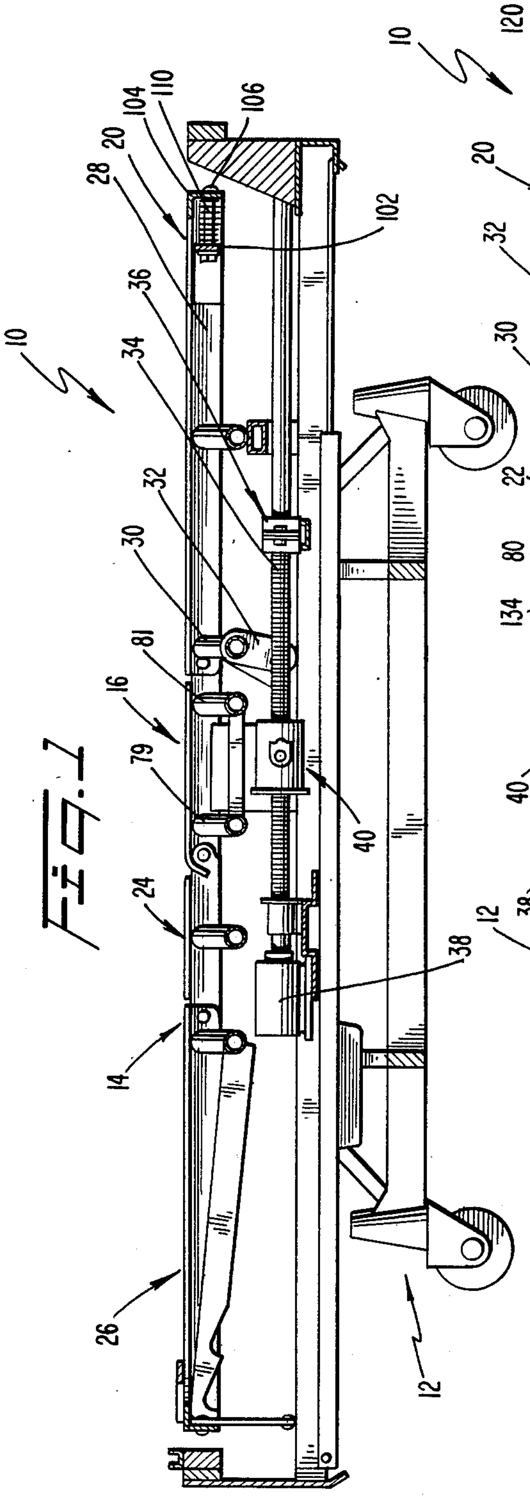
FIG. 1 is a longitudinal sectional view taken through a bed according to the present invention, with the head section of the mattress frame being disposed in a down or horizontal orientation.

FIG. 6 is a horizontal sectional view taken through an upper portion of the head section of the frame, with an actuating handle for the control mechanism being disposed in a released or non-operational mode; and FIG. 7 is an enlarged view of the handle depicted in FIG. 6, with a lock portion of the handle being moved to an unlocking position enabling the handle to be actuated to effect a rapid downward movement of the head section of the frame.

DETAILED DESCRIPTION OF A PREFERRED EMBODIMENT OF THE INVENTION

A hospital bed 10 according to the present invention includes a mobile base 12 and an articulated mattress frame 14 mounted to the base in a conventional manner. The frame 14 includes a seat section 16 which is affixed to the base 12 by means of webs 18. A head section 20 is mounted to the seat section 16 for rotation about a generally horizontal axis defined by pivot pins 22 which are spaced from the front end of such head section. The articulated frame includes thigh and foot sections 24, 26 which may be mounted for adjustable inclination in a conventional manner.

The frame 14 is adapted to support a mattress (not shown) and to change the contour thereof upon appropriate re-orientation of the articulated sections.

The head section 20 of the frame 14 includes a pair of torque transfer legs 28 which extend longitudinally along the head section and are fixedly interconnected by a cross bar 30.

A pair of spaced flanges 32 are fixedly secured to the cross bar 30 to define a pair of downwardly depending bell-crank levers.

Extending longitudinally centrally of the bed 10 is a rotary mechanism 33 which includes a drive screw 34. One end of the screw is journaled in a bearing 36, and the other end is attached to the output shaft of a motor 38 which is mounted on the base 12. The motor 38 may comprise a standard electric motor for rotating the drive screw 34.

Mounted for longitudinal movement along the screw is a traveling force-transfer unit 40. The traveling unit 40 comprises a nut 42 (FIG. 5) which is positioned directly on the screw, and an outer cylindrical sleeve 44 surrounding the nut 42. The nut 42 is coupled to front and rear collars 46, 48 by means of threaded connections, the collars 46, 48 being mounted for rotation within the sleeve 44 by means of front and rear ball bearings 50, 52. Mounted on the sleeve is a slidable latch 54 which is biased toward engagement within a notch 56 of the rear collar 48 by means of a coil tension spring 58. The latch is slidable within a U-shaped bracket 60 affixed to the sleeve 44, with the spring 58 being connected between a screw 62 on the bracket 60 and a screw 64 on the latch 54. The screw 64 projects through a slot 68 in the bracket 60 and is also connected to a cable 70, such as a Bowden wire slidably disposed within a sheath 72.

It will be appreciated that when the latch 54 engages the notch in the rear collar 48, the sleeve 44 and nut 42 are restrained against relative rotation. The sleeve 44 itself is constrained against rotation by means of an arm extending from the sleeve and carrying an apertured block 76 slidably mounted on a fixed rod 78. The rod 78 is attached to a pair of cross-pieces 79, 81 of the seat section 16.

Thus, rotation of the screw 34 produces longitudinal movement of the nut 42 and the sleeve 44 whenever the latch 54 engages within the notch 56, the speed of which longitudinal movement is a function of the speed of rotation of the screw.

A pair of links 80 are pivotably connected at 82 to the sleeve 44 and to the bell-crank levers 32 to convert longitudinal movement of the traveling unit 40 into pivoting movement of the head section 20 of the articulated frame 14.

The nut 42 (FIG. 5) is in the form of a conventional ball bearing screw/nut assembly available for example from Rockford Ball Screw Co. of Rockford, Ill., and thus need not be described in detail. Briefly, the nut 42 has an internal helical race 84 which corresponds to the external helical groove 86 of the screw 34. Ball bearings 88 are mounted within the helical groove and race and are adapted to recirculate from one end of the nut race to the other by means of an external return tube 90. There occurs no physical contact between the screw 34 and the nut 42. As the screw 34 rotates, and the rolling balls 88 reach an end of the nut 42, the balls are conducted to the other end of the race by means of the return tube 90. In this fashion, the balls are able to recirculate endlessly.

While other types of helically grooved screws/nut assemblies may be suitable, a ball bearing screw is preferred for its long life, mechanical efficiency, reduced maintenance, and overall reliability, among other advantages.

It will be appreciated from the foregoing that under normal conditions, the speed of raising and lowering of the head section 20 of the articulated frame 14 is governed by the output speed of the electric motor 38. In accordance with the present invention, however, the nut 42 may be selectively uncoupled from the sleeve 44, thereby releasing the nut 42 for free-wheeling travel along the screw 34. This is accomplished by actuation of the Bowden wire 70 to withdraw the latch 54 from the notch 56. As a result, the rotation-restraining influence of the arm/rod connection 74, 78 is no longer imposed upon the nut 42, whereupon the nut 42 is free to rotate freely upon the shaft 34. Accordingly, the weight of the head section 20 is transmitted to the nut 42 via the bell crank levers 32, the links 80, the sleeve 44, and the collar(s) 46, 48 to push the traveling unit 40 longitudinally along the screw 34 toward the foot of the bed. This results in a high-speed travel of the head section 20 to the "down" position.

If desired, a spring or dampening device (not shown) can be provided which acts against between the head section 20 and the base 12 to brake the downward movement of the head section.

Figure 3:
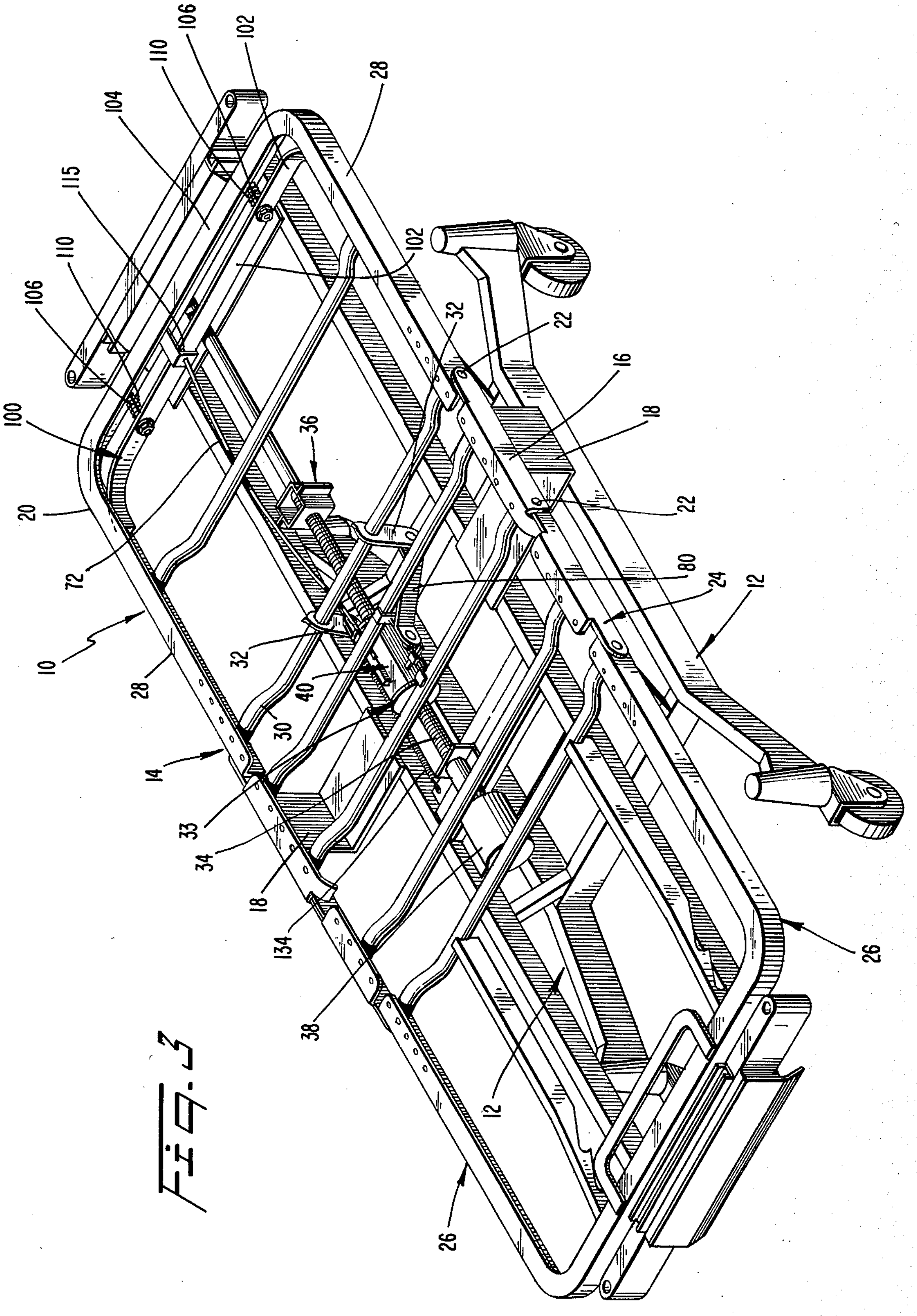
FIG. 3 is a perspective view of the bed depicted in FIGS. 1 and 2.
Figure 4:
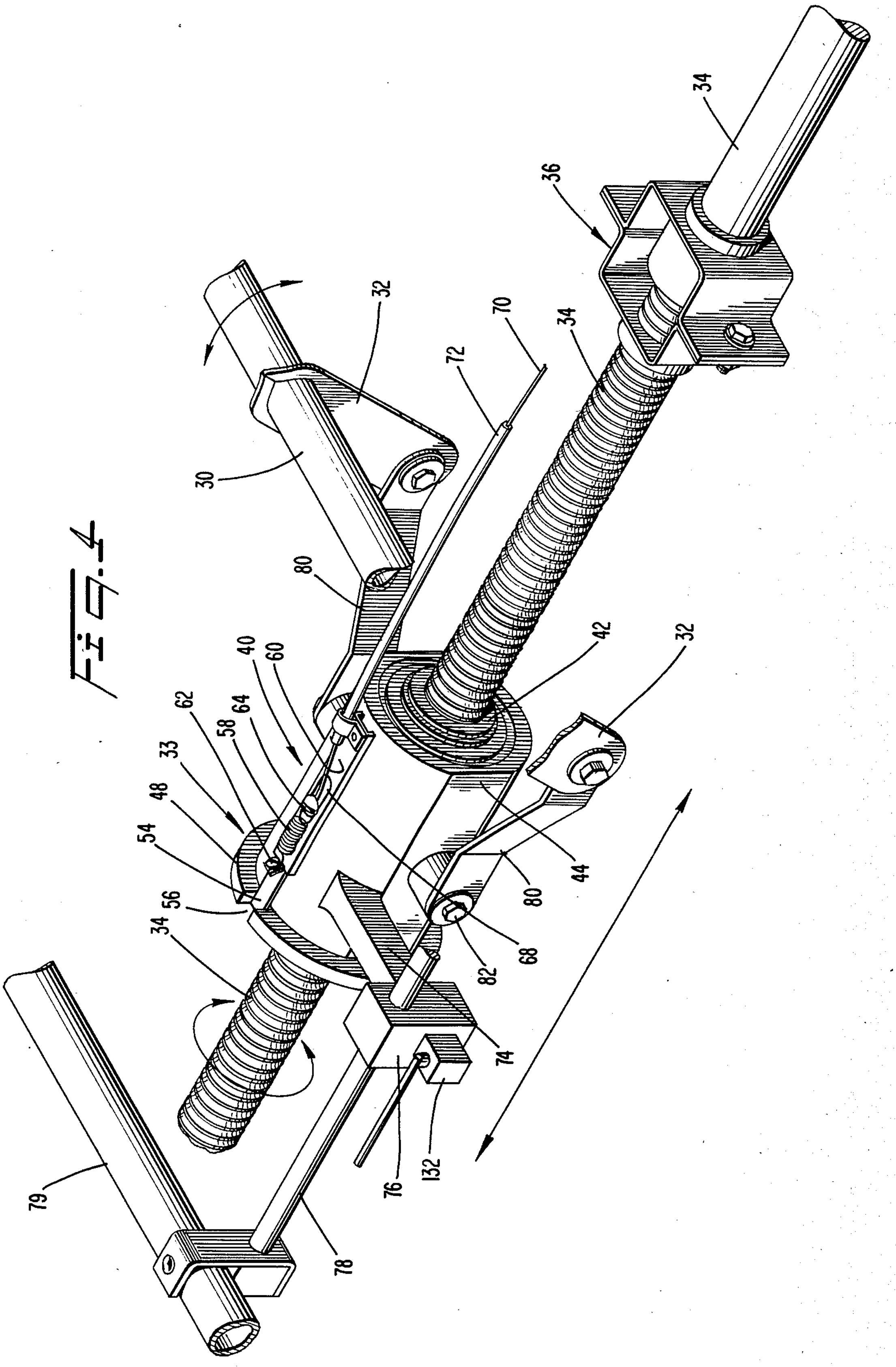
FIG. 4 is an enlarged perspective view, with parts broken away, of a mechanism for changing the inclination of the head section of the frame, and including a traveling unit in which the sleeve member is operatively coupled to a nut member by means of a latch to prevent rotation of the nut member.

Actuation of the latch 54 can be effected in numerous ways, such as by the afore-described Bowden wire 70. In the event that a Bowden wire 70 is employed, it is desirable to provide a manually-actuable handle 100 on the head section 20 for displacing the Bowden wire 70. A suitable handle 100 comprises a bar 102 mounted to the transverse end rail 104 of the head section, just inside of that rail. The rail 104 includes a plurality of guide pins 106 (FIG. 6) at the opposite ends of the rail, which pins project through apertures 108 in the bar 102. A coil compression spring 110 surrounds each guide pin 106 and acts between the rail 104 and a bushing 112 which is slidably mounted on the guide pin 106. The springs 110 thus urge the bar 102 away from the rail 104 and into engagement with washers 114 carried at the ends of the guide pins 106. By displacing the bar or handle 102 toward the rail, the Bowden wire 70, which is connected at 115 (FIG. 3) to the handle 102, is displaced, thereby pulling the latch 54 out of the notch 56.

At each end of the bar 102 is disposed a lock 116 in the form of a metal strip which is manually slidable parallel to the rail 104 (see the arrow 118 in FIG. 7). In this regard, the strip 116 includes a projection 120 which extends through an opening 122 in the bar 102. The projection is thus capable of being pulled manually in the direction 118 by an operator pulling upon the projection 120. The strip has a slot 124 therein through which the guide pin 106 projects. A coil tension spring 126 is connected between the handle 102 and normally biases the strip 116 to a position in which the slot 124 bottoms-out within an annular groove 130 of the guide pin 106. In such a position, the lock strip 116 blocks movement of the bar 102 toward the rail 104. By pulling on the strip to center the slot 124 relative to the pin 106, the associated end of the handle 102 can be displaced toward the rail in order to displace the Bowden wire 70. Thus, the handle 102 can be actuated from either end to disengage the sleeve 44 from the nut 42. Upon subsequent release of the bar 102, the latter is pushed away from the rail 104 by the spring 110, and the lock 116 is urged by the spring 126 into the groove 130 as soon as the groove 130 and latch 116 become realigned.

A limit switch 132 is mounted on the arm 74 and is arranged to contact an abutment, such as the cross-piece 79 in order to shut-off the motor 38 when the head section 20 has reached a fully reclined position.

Figure 2:
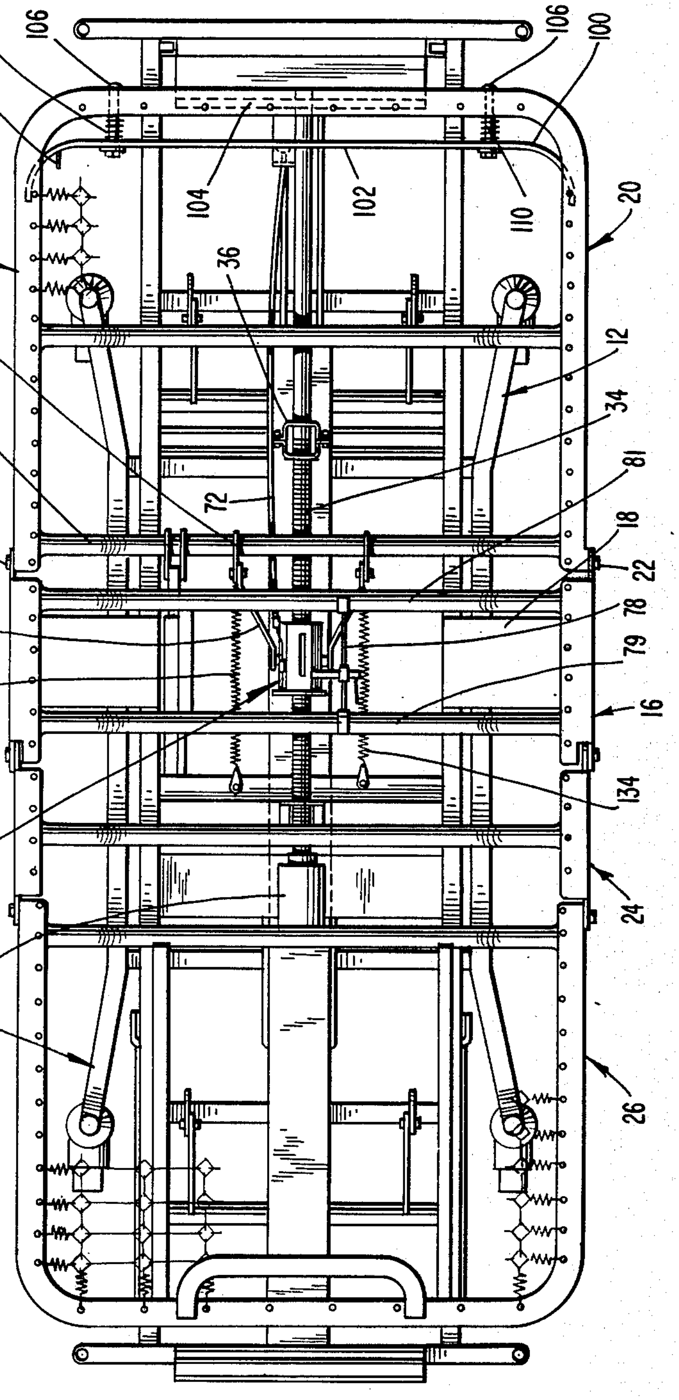
FIG. 2 is a plan view of an articulated bed according to the present invention, with the head section of the mattress frame being in a down position.

One or more coil tension springs 134 (FIG. 2) can be interconnected between the base 12 and the bell crank levers 32 in order to bias the head section 20 downwardly. This aids in starting the traveling unit 40 when the head section is being moved from the up position to the down position.

IN OPERATION, the head section 20 of the mattress frame 14 has its inclination changed by actuation of the motor 38 in conventional fashion, that is, the motor rotates the screw 34, whereupon the traveling unit 40 moves longitudinally along the screw. The links 80 which interconnect the sleeve 44 with the belt crank levers 32 cause the head section to be swung about its mounting axis 22. The traveling unit 40 moves longitudinally in accordance with the speed of the motor 38 because the nut 42 is constrained against rotation about its own longitudinal axis. That is, the sleeve 44 is constrained against rotation due to the sliding engagement between the arms 74 and the rod 78. The latch 54 locks the sleeve 44 to the nut 42 by being engaged within the notch 56 in the collar portion 48 of the nut.

In the event that the head section is in an inclined position, and there arises a critical need to immediately treat the patient in a horizontal position, the head section 20 of the frame can be lowered at a rapid rate independently of the speed of the motor. This is achieved by unlocking the handle 102 by pulling the lock strip 116 to an unlocking position, and the moving the handle 102 toward, the upper rail 104 of the bed. As a result, the Bowden wire 70 is displaced to pull the latch 54 out of engagement with the collar 48, whereby the nut 42 is capable of rotation about its own axis. As a result, the nut is able to free-wheel along the screw, enabling the entire head section to be swung downwardly at a very rapid rate. When the actuator handle 102 is released, the latch 54 becomes biased in a direction whereby it will re-engage the notch 56 when next becoming aligned therewith, and thereby recouple the drive motor to the head section.

The present mechanism also permits such adjustment of the head section in the event of electrical failure or motor malfunction.

Although the present invention has been described in connection with a preferred embodiment tereof, it will be appreciated by those skilled in the art, that additions, modifications, substitutions, and deletions may be made, without specifically departing from the spirit and scope of the invention, as defined in the appended claims.

What is claimed is:

1. A bed comprising:

a base, a body support frame mounted on said base and including a movable head section for adjusting the inclination of a user's upper torso, a motor, connecting means operably coupling said motor to said head section of said frame for changing the inclination of said head section at a speed governed by said motor, and release means including a manually operated actuator member arranged inaccessibly to a user lying on the bed and movable relative to said head section in a first direction for uncoupling the drive connection between said motor and said head section to enable the latter to be moved downwardly independently of said motor, said actuator member being movable relative to said head section in a second direction for recoupling said drive connection.

2. A bed according to claim 1, wherein said actuator member is mounted on said head section.

3. A bed according to claim 1, wherein said connecting means includes a rotary output shaft in the form of a screw, a nut threadedly mounted on said screw, and means preventing rotation of said nut such that said nut converts rotary motion of said screw into longitudinal movement for moving said head section, said release means being arranged to uncouple said rotation-preventing means from said nut.

4. A bed according to claim 3, wherein said rotation-preventing means comprises a member mounted on said nut, said member being constrained against rotation, and a latch movable into and from interconnection between said nut and said member, said latch preventing rotation of said nut when interconnecting said member and said nut and permitting rotation of said nut when disconnected.

5. A bed according to claim 4, wherein said member comprises a sleeve mounted on said nut by means of rotary bearings, an arm rigidly fastened on said sleeve and having an apertured end slidably mounted on a rod extending parallel to said screw, and a linkage connecting said sleeve with said head portion of said frame.

6. A bed according to claim 5, wherein said latch is slidably mounted on said sleeve and is engageable within a notch in a collar portion of said nut, said actuator member comprising a handle mounted on the underside of said head portion and connected by a wire to said latch.

7. A bed according to claim 6, wherein said latch is spring-biased toward said notch.

8. A bed according to claim 6 including manually releasable locking means for preventing movement of said handle.

9. A bed according to claim 1 including a spring for moving said actuator member in said second direction upon release of said actuator member.

10. A bed comprising:

a base, a frame movably mounted on said base and including a movable head section for adjusting a user's upper torso to various inclinations, an electric motor mounted on said frame, a screw operably connected to said motor for rotation thereby about an axis extending parallel to the longitudinal axis of the bed, a traveling unit mounted on the screw for longitudinal traveling movement therealong in response to screw rotation, said traveling unit including:

a first part threadedly mounted on said screw and movable longitudinally therealong, a second, non-rotatable part movable longitudinally with said first part and operably connected to said head section of said frame to move said head section in response to longitudinal movement of said first part, force transmitting means movable between:

a first position interconnecting said first and second parts to prevent rotation of said first part and thereby constrain the speed of said traveling member to be governed by the speed of said motor, and a second position permitting rotation of said first part to enable said traveling unit to move longitudinally along said screw independently of the speed of said motor, and an actuator means including a manually operated actuator member arranged inaccessibly to a user lying on the bed and connected to said force transmitting means, said actuator member being movable relative to said head section in a first direction for moving said force transmitting means to said second position to enable said head section to be moved downwardly independently of said motor, said actuator member being movable relative to said head section in a second direction for reinterconnecting said first and second parts.

11. A bed according to claim 10, wherein said force transmitting means includes a movable element mounted on one of said first and second parts and releasably engageable with the other, said actuator member being connected to said element to shift same.

12. A bed according to claim 11, wherein said actuator member comprises a handle mounted on the underside of said head section.

13. A bed according to claim 12 including manually releasable locking means preventing movement of said handle.

14. A bed according to claim 10, wherein said first part is a nut and said second part is a sleeve mounted on said nut by bearing means for permitting relative rotation between said sleeve and said nut about the axis of said screw.

15. A bed according to claim 14, said sleeve including an arm slidably mounted on a stationary arm of said frame to prevent rotation of said second part.

16. A bed according to claim 10 including a spring for moving said actuator member in said second direction upon release thereof.

17. A bed comprising:

a base, a frame mounted on said base and including an articulated head section for adjusting the inclination of a user's upper torso, a motor, a screw oriented lengthwise of the bed and being connected to said motor for rotation about its longitudinal axis, a nut mounted on said screw for longitudinal movement therealong, a non-rotatable sleeve mounted on said nut by bearing means permitting rotation of said nut relative to said sleeve about said axis, linkage interconnecting said sleeve with said head section for changing the inclination of the latter in response to longitudinal movement of said sleeve, an element of said sleeve spring-biased into operable connection with said nut for preventing rotation of said nut and thereby constraining said nut for longitudinal movement along said screw in accordance with the speed of rotation of said screw, and means including a manually actuable handle mounted on said head section inaccessibly to a user lying on the bed and connected to said element for releasing said element from said nut when said handle is moved relative to said head section in a first direction, allowing said nut to rotate upon said screw and travel longitudinally therealong independently of the speed of rotation of said screw, said handle being movable relative to said head section in a second direction to enable said spring-biased element to be reconnected with said nut.

* * * * *